(12) United States Patent
Guen et al.

(10) Patent No.: US 10,319,975 B2
(45) Date of Patent: *Jun. 11, 2019

(54) RECHARGEABLE BATTERY

(71) Applicant: SAMSUNG SDI CO., LTD., Yongin-si, Gyeonggi-do (KR)

(72) Inventors: Minhyung Guen, Yongin-si (KR); Yongjin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,833

(22) Filed: Aug. 3, 2016

(65) Prior Publication Data

US 2017/0133655 A1    May 11, 2017

(30) Foreign Application Priority Data

Nov. 11, 2015    (KR) ........................ 10-2015-0158231

(51) Int. Cl.
| | |
|---|---|
| *H01M 2/18* | (2006.01) |
| *H01M 2/04* | (2006.01) |
| *H01M 2/06* | (2006.01) |
| *H01M 10/0525* | (2010.01) |
| *H01M 2/22* | (2006.01) |
| *H01M 2/30* | (2006.01) |

(Continued)

(52) U.S. Cl.
CPC ............... *H01M 2/18* (2013.01); *H01M 2/04* (2013.01); *H01M 2/06* (2013.01); *H01M 2/22* (2013.01); *H01M 2/30* (2013.01); *H01M 10/0525* (2013.01); *H01M 2/0207* (2013.01); *H01M 2/0217* (2013.01); *H01M 2/1235* (2013.01); *H01M 2/263* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | |
|---|---|---|
| 2010/0086845 A1 | 4/2010 | Jung et al. |
| 2011/0076528 A1 | 3/2011 | Lim |

(Continued)

FOREIGN PATENT DOCUMENTS

| | | |
|---|---|---|
| CN | 202454638 U | 9/2012 |
| JP | 2008-204770 A | 9/2008 |

(Continued)

OTHER PUBLICATIONS

EPO Extended Search Report dated Jun. 20, 2017, for corresponding European Patent Application No. 16198113.9 (11 pages).

(Continued)

*Primary Examiner* — Carmen V Lyles-Irving
(74) *Attorney, Agent, or Firm* — Lewis Roca Rothgerber Christie LLP

(57) ABSTRACT

A rechargeable battery including: a case; an electrode assembly including a plurality of electrode sub-assemblies accommodated in the case; a plurality of terminals electrically connected to the electrode assembly; a cap plate sealing the case; and an insulation plate between the electrode assembly and the terminals and being hingedly coupled to the cap plate. The terminals protrude through the cap plate.

5 Claims, 7 Drawing Sheets

(51) Int. Cl.
  *H01M 2/02*  (2006.01)
  *H01M 2/12*  (2006.01)
  *H01M 2/26*  (2006.01)

(56) References Cited

U.S. PATENT DOCUMENTS

| | | | |
|---|---|---|---|
| 2011/0129725 A1 | 6/2011 | Baek | |
| 2012/0009451 A1 | 1/2012 | Yoo | |
| 2012/0052341 A1 | 3/2012 | Kim et al. | |
| 2012/0214050 A1 | 8/2012 | Kim | |
| 2012/0308855 A1 | 12/2012 | Shimizu et al. | |
| 2013/0029188 A1 | 1/2013 | Kim et al. | |
| 2013/0078505 A1* | 3/2013 | Kim | H01M 2/18 429/179 |
| 2015/0147636 A1* | 5/2015 | Kim | H01M 2/06 429/179 |
| 2015/0263330 A1* | 9/2015 | Seo | H01M 2/345 429/7 |
| 2015/0340663 A1 | 11/2015 | Minagata et al. | |
| 2016/0099444 A1* | 4/2016 | Park | H01M 2/06 429/82 |
| 2016/0336574 A1* | 11/2016 | Guen | H01M 2/0482 |

FOREIGN PATENT DOCUMENTS

| | | |
|---|---|---|
| JP | 2013-025882 A | 2/2013 |
| JP | 2014-192106 A | 10/2014 |
| KR | 10-2007-0100978 A | 10/2007 |
| KR | 10-2008-0037869 A | 5/2008 |
| KR | 10-2008-0066314 A | 7/2008 |
| KR | 10-2011-0060782 | 6/2011 |
| KR | 10-2012-0006234 A | 1/2012 |
| KR | 10-2012-0024412 A | 3/2012 |
| KR | 10-2013-0012539 A | 2/2013 |
| KR | 10-2014-0017743 A | 2/2014 |
| WO | WO 2014/002647 A1 | 1/2014 |

OTHER PUBLICATIONS

U.S. Office Action dated Jan. 20, 2017, issued in U.S. Appl. No. 14/733,584 (16 pages).
U.S. Office Action dated May 19, 2017, issued in U.S. Appl. No. 14/733,437 (9 pages).
U.S. Office Action dated May 25, 2017, issued in U.S. Appl. No. 14/733,584 (17 pages).
U.S. Office Action dated Aug. 10, 2017, issued in U.S. Appl. No. 14/946,803 (14 pages).
U.S. Advisory Action dated Aug. 11, 2017, issued in U.S. Appl. No. 14/733,584 (4 pages).
U.S. Notice of Allowance dated Sep. 6, 2017, issued in U.S. Appl. No. 14/733,437 (5 pages).
U.S. Office Action dated Dec. 18, 2017, issued in U.S. Appl. No. 14/733,584 (14 pages).
U.S. Notice of Allowance dated Feb. 2, 2018, issued un U.S. Appl. No. 14/733,437 (5 pages).

* cited by examiner

RECHARGEABLE BATTERY

CROSS-REFERENCE TO RELATED APPLICATION

This application claims priority to and the benefit of Korean Patent Application No. 10-2015-0158231, filed on Nov. 11, 2015 in the Korean Intellectual Property Office, and all the benefits accruing therefrom under 35 U.S.C. § 119, the contents of which are herein incorporated by reference in their entirety.

BACKGROUND

1. Field

Embodiments of the present invention relate to a rechargeable battery.

2. Description of the Related Art

A rechargeable battery is a battery that is designed to be repeatedly charged and discharged, unlike a primary battery. A small-capacity rechargeable battery is used as a power supply for small electronic devices, such as cellular phones, notebook computers, camcorders, and the like, while a large-capacity rechargeable battery is used as a power supply for driving motors, such as in hybrid vehicles, electric vehicles, and the like.

For example, a rechargeable battery includes an electrode assembly for performing charging and discharging operations, a case accommodating the electrode assembly, a cap plate coupled to the case at an opening thereof, and electrode terminals drawing the electrode assembly outside of the cap plate and the case.

Recently, efforts have been made to fabricate high-capacity batteries including multi-tab structures extending from uncoated regions of an electrode assembly. However, the multi-tab structures may suffer from problems, such as welding failures or structural vulnerability due to being relatively thick.

SUMMARY

Embodiments of the present invention provide a rechargeable battery which can prevent or substantially reduce damage to an electrode assembly due to impacts applied thereto in a vertical direction.

The above and other aspects of the present invention will be described in, or will be apparent from, the following description of exemplary embodiments.

According to an embodiment of the present invention, a rechargeable battery includes: a case; an electrode assembly including a plurality of electrode sub-assemblies accommodated in the case; a plurality of terminals electrically connected to the electrode assembly; a cap plate sealing the case; and an insulation plate between the electrode assembly and the terminals and being hingedly coupled to the cap plate. The terminals protrude through the cap plate.

The insulation plate may be configured to pivot in a widthwise direction of the cap plate.

The rechargeable battery may further include gaskets covering top portions of the terminals and may include coupling openings in at least one side thereof. The insulation plate may include hooks at opposite sides thereof and may be configured to be fastened to the gaskets at the coupling openings by the hooks.

Heights of the coupling openings may be greater than thicknesses of the hooks.

The hooks may be coupled to the gaskets at the coupling openings so as to be vertically movable with respect to the gaskets.

The hooks may be configured to pivot within the coupling openings in a widthwise direction of the insulation plate.

The hooks may pass through the coupling openings and may extend into the gaskets to be coupled to thereto.

The insulation plate may include support regions at opposite ends of the insulation plate in a lengthwise direction thereof, and the hooks may protrude toward an interior of the case.

The hooks may be in a center of the support regions.

Each of the hooks may include a protrusion protruding from the support region and a fastener at an end of the protrusion. Thicknesses of the fasteners may be greater than thicknesses of the protrusions.

A height of each of the coupling openings of the gaskets may be greater than the thicknesses of the protrusions and smaller than the thicknesses of the fasteners.

The cap plate may include protrusions protruding from a bottom surface of the cap plate toward an interior of the case, and the insulation plate may include recessed coupling grooves at regions corresponding to the protrusions. The protrusions may be hingedly coupled to the insulation plate at the coupling grooves.

The protrusions may be at opposite edges of the cap plate in a lengthwise direction thereof.

The protrusions may be at a central region of the cap plate in a lengthwise direction thereof.

Ends of the protrusions may have a cone, a curve, or a polygon shape.

As described above, in the rechargeable battery according to an embodiment of the present invention, protrusions are formed on an insulation plate which is coupled to an electrode assembly, and the protrusions engage coupling openings of gaskets fixed to the cap plate to allow the insulation plate to pivot or move with respect to the protrusions, thereby balancing the electrode assembly.

BRIEF DESCRIPTION OF THE DRAWINGS

The above and other features and aspects of the present invention will become more apparent by describing, in detail, exemplary embodiments thereof with reference to the attached drawings, in which.

DETAILED DESCRIPTION

Hereinafter, examples of embodiments of the present invention will be described in detail with reference to the accompanying drawings such that they can easily be made and used by those skilled in the art.

Figure 1:
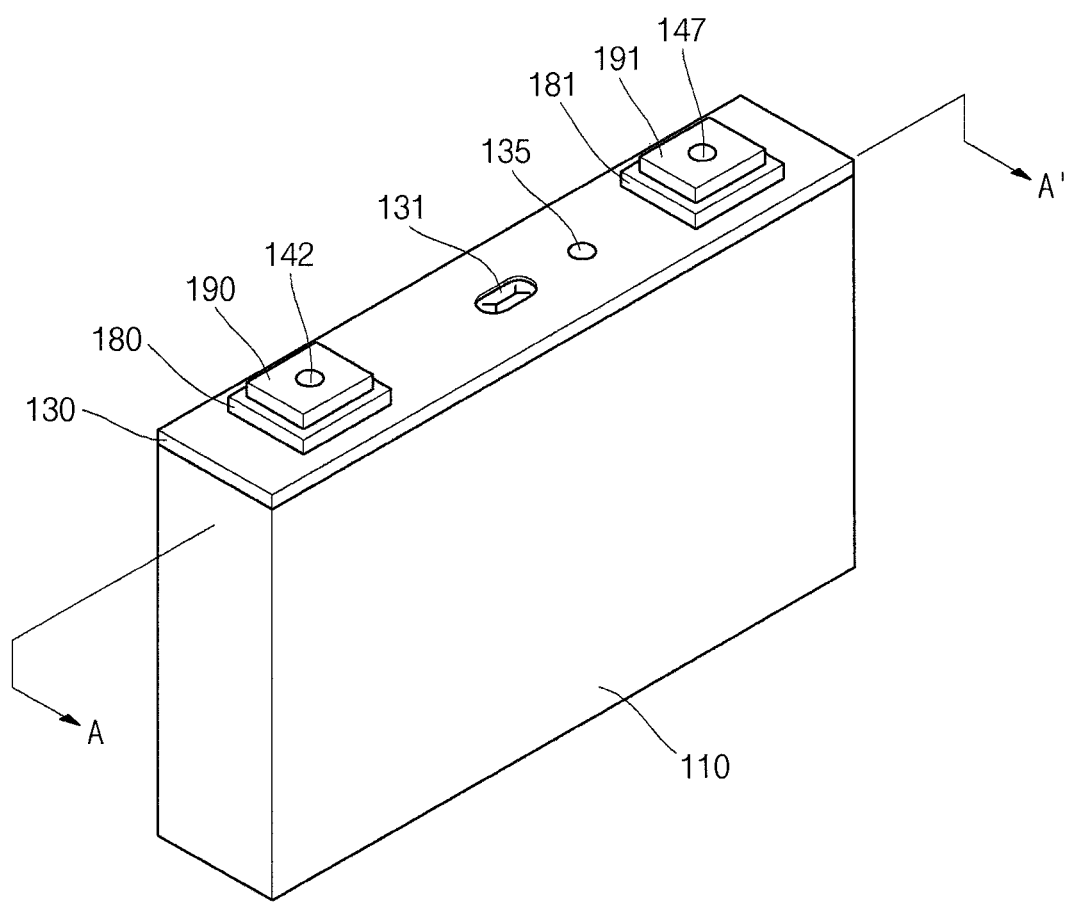
FIG. 1 is a perspective view of a rechargeable battery according to an embodiment of the present invention.
Figure 2:
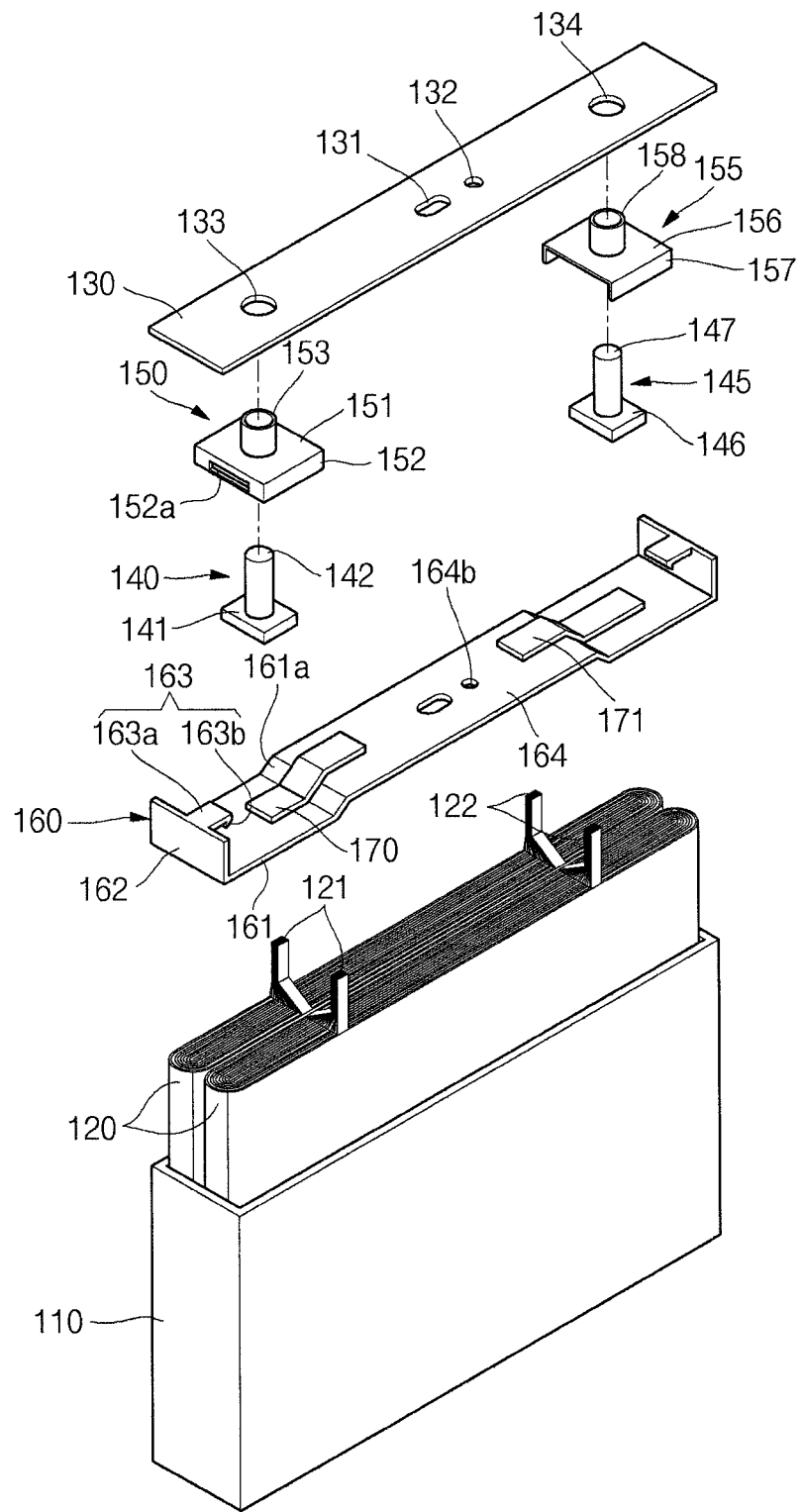
FIG. 2 is an exploded perspective view of the rechargeable battery shown in FIG. 1.
Figure 3:
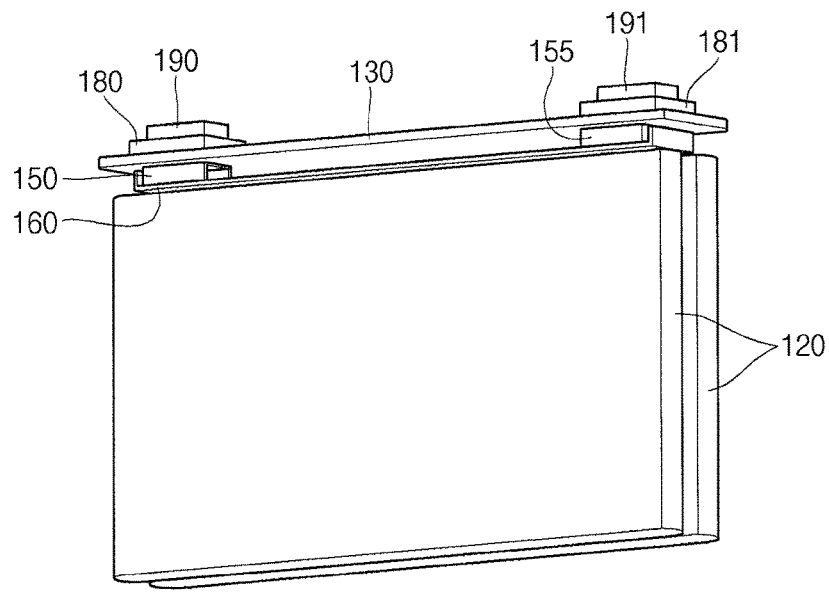
FIG. 3 illustrates an electrode assembly of the rechargeable battery shown in FIG. 1 coupled to a cap plate.
Figure 4:
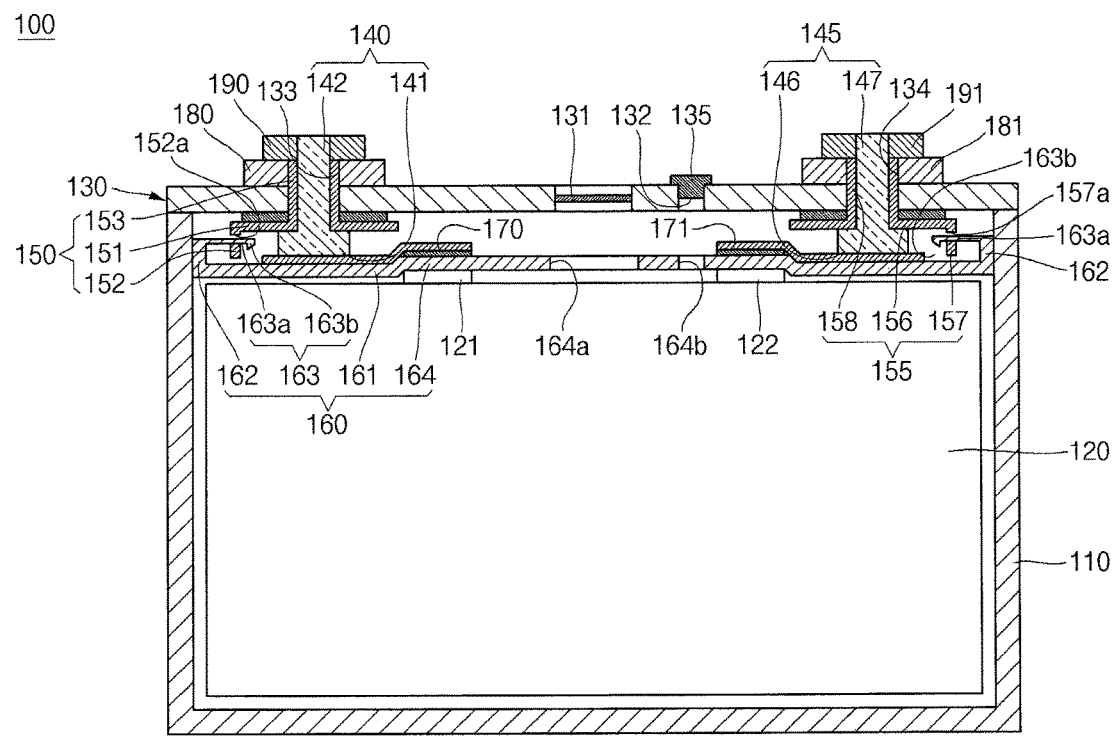
FIG. 4 is a cross-sectional view taken along the line A-A' of FIG. 1.
Figure 5:
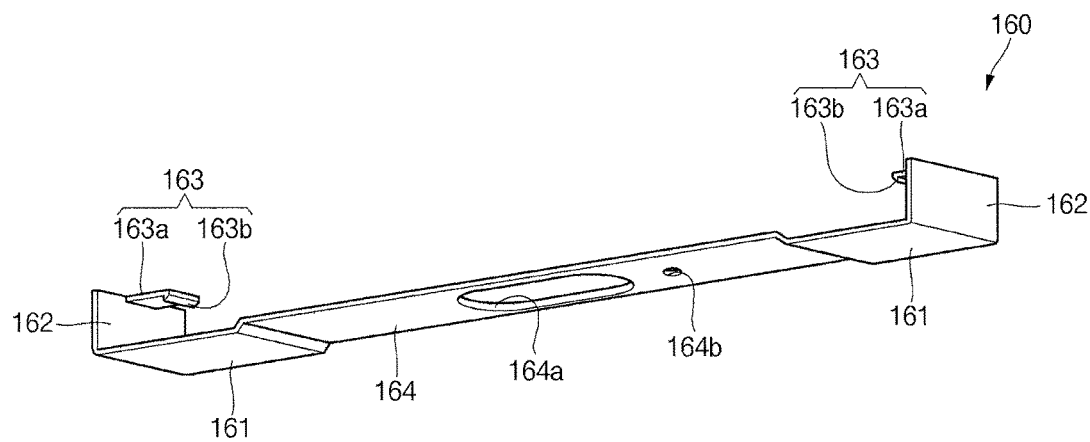
FIG. 5 is a perspective view illustrating an insulation plate of the rechargeable battery shown in FIG. 1.
Figure 6:
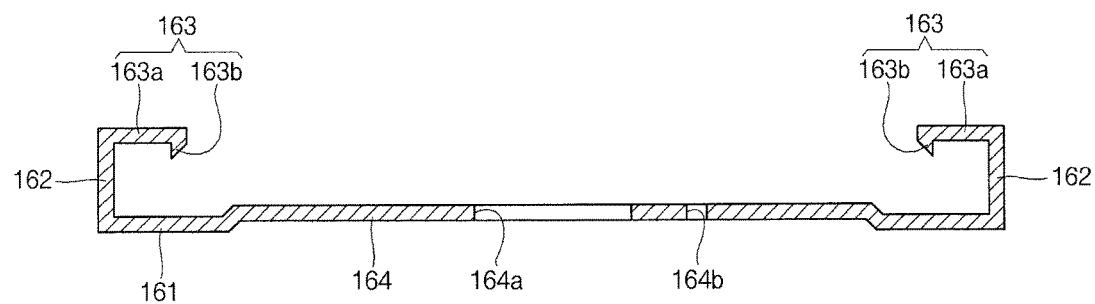
FIG. 6 is a front view of the insulation plate of the rechargeable battery shown in FIG. 1.

FIG. 1 is a perspective view of a rechargeable battery according to an embodiment of the present invention, FIG. 2 is an exploded perspective view of the rechargeable battery shown in FIG. 1, FIG. 3 illustrates an electrode assembly of the rechargeable battery shown in FIG. 1 coupled to a cap plate, FIG. 4 is a cross-sectional view taken along the line A-A' of FIG. 1, FIG. 5 is a perspective view illustrating an insulation plate of the rechargeable battery shown in FIG. 1, and FIG. 6 is a front view of the insulation plate of the rechargeable battery shown in FIG. 1.

Referring to FIGS. 1-6, the rechargeable battery 100 according to an embodiment of the present invention may include a case 110, an electrode assembly 120 accommodated in the case 110, a cap plate 130 sealing the case 110, electrode terminals 140 and 145 electrically connected to the electrode assembly 120, gaskets 150 and 155 positioned between the electrode terminals 140 and 145 and the cap plate 130, an insulation plate 160 positioned between the electrode terminals 140 and 145 and the electrode assembly 120, lead tabs 170 and 171 formed on the insulation plate 160 and forming connecting paths between the electrode terminals 140 and 145 and the electrode assembly 120 (e.g., respectively electrically connecting the electrode terminals 140 and 145 to the electrode assembly 120), insulation members 180 and 181, and terminal plates 190 and 191. The insulation members 180 and 181 and the terminal plates 190 and 191 are on the cap plate 130.

The case 110 is formed of a conductive metal, such as aluminum, aluminum alloy, or nickel plated steel, and has a substantially hexahedral shape having an opening through which the electrode assembly 120 is inserted and positioned. The opening corresponds generally to a peripheral portion of the case 110 contiguous to the cap plate 130.

An internal surface of the case 110 is subjected to insulating treatment (e.g., is insulated or coated with an insulating material), thereby preventing an internal electrical short from occurring inside the case 110. In some embodiments, one electrode of the electrode assembly 120 may be electrically connected to the case 110 through the cap plate 130. In such an embodiment, an internal electric short may also be prevented by insulating the internal surface of the case 110.

The electrode assembly 120 is formed by winding or laminating a stack including a first electrode plate, a separator, and a second electrode plate, each of which are thin plates or layers. In one embodiment, the first electrode plate may serve as a positive electrode, and the second electrode plate may serve as a negative electrode. However, the present invention is not limited thereto, and the polarities of the first electrode plate and the second electrode plate may be reversed from the above-described embodiment.

The first electrode plate is formed by coating a first electrode active material, such as a transition metal oxide, on a first electrode current collector including (e.g., formed of) a metal foil, such as an aluminum foil, and has a first electrode uncoated portion corresponding to a region at which the first electrode active material is not applied. The first electrode uncoated portion may be a current flow path between the first electrode plate and outside of the first electrode plate. However, the material of the first electrode plate is not limited to those listed herein.

In addition, the first electrode uncoated portion may include a first current collector tab 121. The first current collector tab 121 may include multiple or a plurality of first current collector tabs 121 that protrude from the first electrode uncoated portion. The multiple first current collector tabs 121 may form a multi-tab structure configured or arranged such that they overlap each other (e.g., overlap each other at a predetermined location) when the electrode assembly 120 is wound. The first electrode plate may be wound in a state in which the multiple first current collector tabs 121 are spaced from (e.g., spaced a predetermined distance apart from) one another. Because the first current collector tab 121 is integrally formed with the first electrode plate and is drawn out from (e.g., extends from) the wound electrode assembly 120, current collecting efficiency of the electrode assembly 120 can be increased. However, the present invention is not limited thereto, and the first current collector tab 121 may be formed as a separate member or members independent of the first electrode plate.

The second electrode plate is formed by coating a second electrode active material, such as graphite or carbon, on a second electrode current collector including (e.g., formed of) a metal foil, such as a copper or nickel foil, and has a second electrode uncoated portion corresponding to a region at which the second electrode active material is not applied.

In addition, the second electrode uncoated portion may include a second current collector tab 122 similar to the first current collector tab 121. The second current collector tab 122 may include multiple or a plurality of second current collector tabs 122 that protrude from the second electrode uncoated portion. The second current collector tab 122 may be formed by winding the second electrode plate in a state in which the multiple second current collector tabs 122 are spaced from (e.g., spaced a predetermined distance apart from) one another.

The separator, positioned between the first and second electrodes, prevents an electrical short therebetween and allows movement of lithium ions. The separator may include (e.g., may be made of) polyethylene, polypropylene, or a composite film including polyethylene and polypropylene. However, the material of the separator is not limited to the specific materials listed herein.

The electrode assembly 120 is accommodated in the case 110 together with an electrolyte solution. The electrolyte solution may include an organic solvent, such as ethylene carbonate (EC), propylene carbonate (PC), diethyl carbonate (DEC), ethyl methyl carbonate (EMC), dimethyl carbonate (DMC), and the like, and a lithium salt, such as $LiPF_6$ or $LiBF_4$. The electrolyte solution may be a liquid, a solid, or a gel. The first current collector tab 121 and the second current collector tab 122 are respectively electrically connected to the lead tabs 170 and 171. For clarity and brevity, the current collection tabs 121 and 122 are illustrated and described as being disposed in a vertically extending state as illustrated in FIG. 2. However, when the rechargeable battery 100 includes two electrode assemblies 120 (e.g., two electrode sub-assemblies), the insulation plate 160 is then inserted below the lead tabs 170 and 171, the current collection tabs 121 and 122 are bent approximately 90 degrees, and the current collection tabs 121 and 122 are respectively welded to the lead tabs 170 and 171 by ultrasonic welding, thereby completing the structure shown in FIGS. 3 and 4.

The cap plate 130 has a plate shape and seals the opening of the case 110. In addition, the cap plate 130 and the case 110 may be formed of the same material. The cap plate 130 may be coupled to the case 110 by, for example, laser welding. In addition, the cap plate 130 may be electrically independent (e.g., electrically insulated from) or may be electrically connected to one of the first and second current collection tabs 121 and 122. For example, the cap plate 130 may be electrically connected to the first current collection tab 121. In one embodiment, the cap plate 130 and the case 110 may have the same polarity (e.g., a first polarity). In other embodiments, however, the cap plate 130 may be electrically connected to the second current collection tab 122.

The cap plate 130 includes a safety vent 131 approximately centrally located on the cap plate 130. The safety vent 131 has a smaller thickness than other regions of the cap plate 130. When the internal pressure in the case 110 becomes greater than a certain level (e.g., a predetermined level), the safety vent 131 opens or ruptures before other regions of the cap plate 130, thereby preventing the rechargeable battery 100 from exploding.

In addition, the cap plate 130 includes an injection opening 132 (e.g., an injection hole) formed in at least one region of the cap plate 130 for injection of an electrolyte solution. The electrolyte solution is injected into the case 110 (e.g., is injected through the cap plate 130) through the injection opening 132. Then, the injection opening 132 is sealed by a plug 135.

In addition, the cap plate 130 includes openings 133 and 134 (e.g., through-holes) formed at opposite ends of the cap plate 130 to allow the electrode terminals 140 and 145 to pass therethrough. The electrode terminals 140 and 145 may be upwardly exposed through the cap plate 130 through the openings 133 and 134 to then be connected to the terminal plates 190 and 191

The electrode terminals 140 and 145 are electrically connected to the first and second current collection tabs 121 and 122 of the electrode assembly 120, respectively. The first electrode terminal 140 may be coupled to the lead tab 170 which is connected to the first current collection tab 121, and the second electrode terminal 145 may be coupled to the lead tab 171 which is connected to the second current collection tab 122. In one embodiment, the first and second electrode terminals 140 and 145 may be coupled to the lead tabs 170 and 171, respectively, by using ultrasonic welding.

The first electrode terminal 140 includes a body 141 (e.g., a body unit) coupled to the lead tab 170, and a terminal post 142 (e.g., a terminal unit) vertically protruding from the body 141. The terminal post 142 may have a height (e.g., may protrude above the body 141) such that it is exposed through or outside of the cap plate 130. In addition, the second electrode terminal 145 includes a body 146 (e.g., a body unit) and a terminal post 147 (e.g., a terminal unit) similar to those of the first electrode terminal 140.

The gaskets 150 and 155 are respectively positioned between the electrode terminals 140 and 145 and the cap plate 130. The gaskets 150 and 155 are formed to cover the bodies 141 and 146 of the electrode terminals 140 and 145, and the terminal posts 142 and 147 pass through the gaskets 150 and 155. The gaskets 150 and 155 respectively include flatly formed bases 151 and 156 (e.g., plates or plate units), covers 152 and 157 (e.g., cover units) extending vertically downward from the plates 151 and 156, and sealing parts 153 and 158 extending vertically upward from the plates 151 and 156.

For example, the covers 152 and 157 respectively cover the bodies 141 and 146 of the electrode terminals 140 and 145. In addition, the covers 152 and 157 include coupling openings 152a and 157a (e.g., coupling holes) formed therein. The coupling openings 152a and 157a are respectively formed on outermost surfaces of the covers 152 and 157 at central regions in a horizontal direction of the outermost surfaces thereof. Hooks 163 (e.g., hook units) of or protruding from the insulation plate 160, which will be further described below, are coupled to the gaskets 150 and 155 at the coupling openings 152a and 157a thereof, thereby coupling the gaskets 150 and 155 to the insulation plate 160. In addition, heights of the coupling openings 152a and 158a may be greater than a thickness of the hooks 163 of the insulation plate 160, thereby allowing the hooks 163 to move vertically within the coupling openings 152a and 158a. Therefore, the electrode assembly 120, which is coupled to the gaskets 150 and 155 and the cap plate 130 by the hooks 163, may be capable of moving vertically with respect to the hooks 163 and the insulation plate 160. Accordingly, when the electrode assembly 120 includes a plurality of electrode assemblies (e.g., a plurality of electrode sub-assemblies), the hooks 163 may act as hinges for the insulation plate 160, thereby accommodating movement of the electrode assemblies.

The sealing parts 153 and 158 are formed to respectively pass through the openings 133 and 134 of the cap plate 130. In addition, the terminal posts 142 and 147 of the electrode terminals 140 and 145 may respectively pass through the sealing parts 153 and 158 (e.g., through internal openings in the sealing parts 153 and 158), and the sealing parts 153 and 158 may respectively pass through the openings 133 and 134 of the cap plate 130 while surrounding a periphery of the terminal posts 142 and 147. Therefore, the terminal posts 142 and 147 of the electrode terminals 140 and 145 may be electrically insulated from the cap plate 130.

The insulation plate 160 is positioned between the electrode terminals 140 and 145 and the electrode assembly 120. The insulation plate 160 protects the electrode assembly 120. For example, when the cap plate 130 is deformed (e.g., when an internal surface of the cap plate 130 is deformed), the insulation plate 160 may prevent the electrode assembly 120 from being damaged. In addition, the insulation plate 160 may fix the position of the electrode assembly 120 within the case 110 and may electrically isolate the electrode assembly 120 from the cap plate 130. In addition to the insulation plate 160, additional insulation plates may be included on or adjacent to the electrode terminals 140 and 145, thereby improving insulation thereof.

The insulation plate 160 includes a pair of plate regions 161 formed at opposite ends of the insulation plate 160, a pair of support regions 162 protruding from ends (e.g., distal ends) of the plate regions 161 (e.g., ends of the plate regions 161 in a lengthwise direction of the insulation plate 160), two hooks 163 extending in the lengthwise direction, and a central region 164 positioned between the plate regions 161 and connected to the plate regions 161 by inclined surfaces 161a to be above the plate regions 161 with respect to the electrode assembly 120.

The support regions 162 extend vertically from the plate regions 161 so that the hooks 163 can be fastened with the gaskets 150 and 155, thereby fixing the position of the insulation plate 160 between the cap plate 130 and the electrode assembly 120.

The hooks 163 may be formed to protrude toward interior sides of the support regions 162 (e.g., toward a center of the case 110). In addition, the hooks 163 are fastened to the gaskets 150 and 155 at the coupling holes 152a and 157a. In one embodiment, the hooks 163 each include a protrusion 163a (e.g., a protrusion part) and a fastener 163b (e.g., a fastening part) formed at an end of the protrusion 163a. The fastener 163b has a greater thickness than the corresponding protrusion 163a, and after the fasteners 163b are inserted into the respective coupling openings 152a and 157a, the fasteners 163b may not unintentionally become disconnected from the gaskets 150 and 155. To this end, the heights of the coupling openings 152a and 157a may be greater than the thicknesses of the protrusions 163a and smaller than the thicknesses of the fasteners 163b.

The hooks 163 pass through the coupling openings 152a and 157a to then be coupled to the gaskets 150 and 155 and may vertically movable within the coupling openings 152a and 157a. Therefore, the insulation plate 160 may be maintained at a state in which it is suspended at a bottom side of (e.g., below) the cap plate 130 while being coupled to the gaskets 150 and 155. Therefore, the insulation plate 160 vertically moves about the hooks 163, thereby keeping the electrode assembly 120 in balance.

In one embodiment, because a length of the insulation plate 160 is substantially similar to that of an accommodation groove (e.g., the opening) of the case 110, the position of the insulation plate 160 is fixed in the horizontal direction of the case 110. Therefore, it is possible to prevent the insulation plate 160 and the electrode assembly 120 from becoming separated from the gaskets 150 and 155 due to movement of the insulation plate 160.

The central region 164 is positioned higher than the plate regions 161 with respect to the electrode assembly 120 due to the inclined surfaces 161a. Accordingly, a height of the central region 164 may correspond to bent heights of the current collection tabs 121 and 122 of the electrode assembly 120. For example, top ends of the current collection tabs 121 and 122 are bent approximately 90 degrees from the outside toward the inside of the insulation plate 160. In such a state, the current collection tabs 121 and 122 are ultrasonically welded to the lead tabs 170 and 171 of the insulation plate 160. Therefore, because the current collection tabs 121 and 122, which are positioned higher than other regions of the electrode assembly 120, should be maintained at a state in which they are coupled to the lead tabs 170 and 171, the central region 164 is positioned higher than the plate regions 161 with respect to the electrode assembly 120, thereby compensating for a height difference between the insulation plate 160 and the current collection tabs 121 and 122. In addition, a vent opening 164a (e.g., a vent hole) arranged to correspond to the safety vent 131 of the cap plate 130 and an injection opening 164b arranged to correspond to the injection opening 132 may be formed in the central region 164 of the insulation plate 160.

The two lead tabs 170 and 171 are provided on the insulation plate 160. The lead tabs 170 and 171 are formed to extend from the plate regions 161 of the insulation plate 160 onto the central region 164 along the inclined surfaces 161a. First ends of the lead tabs 170 and 171, located on the central region 164, are coupled to (e.g., welded to) the current collection tabs 121 and 122. Therefore, the lead tabs 170 and 171 are electrically connected to the current collection tabs 121 and 122, respectively. In addition, second ends of the lead tabs 170 and 171, located on the plate regions 161, are coupled to (e.g., welded to) the bodies 141 and 146 of the electrode terminals 140 and 145. Therefore, electrical paths are established between the current collection tabs 121 and 122 and the electrode terminals 140 and 145 by the lead tabs 170 and 171, respectively.

The insulation members 180 and 181 are on the cap plate 130. The insulation members 180 and 181 insulate the cap plate 130 from the terminal plates 190 and 191, respectively. In addition, the sealing parts 153 and 158 of the gaskets 150 and 155 and the terminal posts 142 and 147 of the electrode terminals 140 and 145 pass through openings (e.g., throughholes) formed in the insulation members 180 and 181.

In addition, in some embodiments, fastening protrusions may be formed on bottom surfaces of the insulation members 180 and 181, and fastening grooves to be coupled to the fastening protrusions may be formed in the cap plate 130, thereby further fixing the insulation members 180 and 181 to the cap plate 130.

The terminal plates 190 and 191 are on the insulation members 180 and 181. The terminal plates 190 and 191 are coupled to the terminal posts 142 and 147 of the electrode terminals 140 and 145, which are exposed through the openings 133 and 134. In one embodiment, the terminal posts 142 and 147 may be coupled to the terminal plates 190 and 191 by riveting or welding. Accordingly, the electrode plates of the electrode assembly 120 may perform charging and discharging operations through the terminal plates 190 and 191.

As described above, in the rechargeable battery 100 according to an embodiment of the present invention, the protrusions 163a are formed in the insulation plate 160, which is coupled to the electrode assembly 120, and are coupled to the gaskets 150 and 155, which are fixed to the cap plate 130, at the coupling openings 152a and 157a thereof, thereby allowing the insulation plate 160 to move (e.g., pivot) about the protrusions 163a.

Hereinafter, a rechargeable battery according to another embodiment of the present invention will be described.

Figure 7:
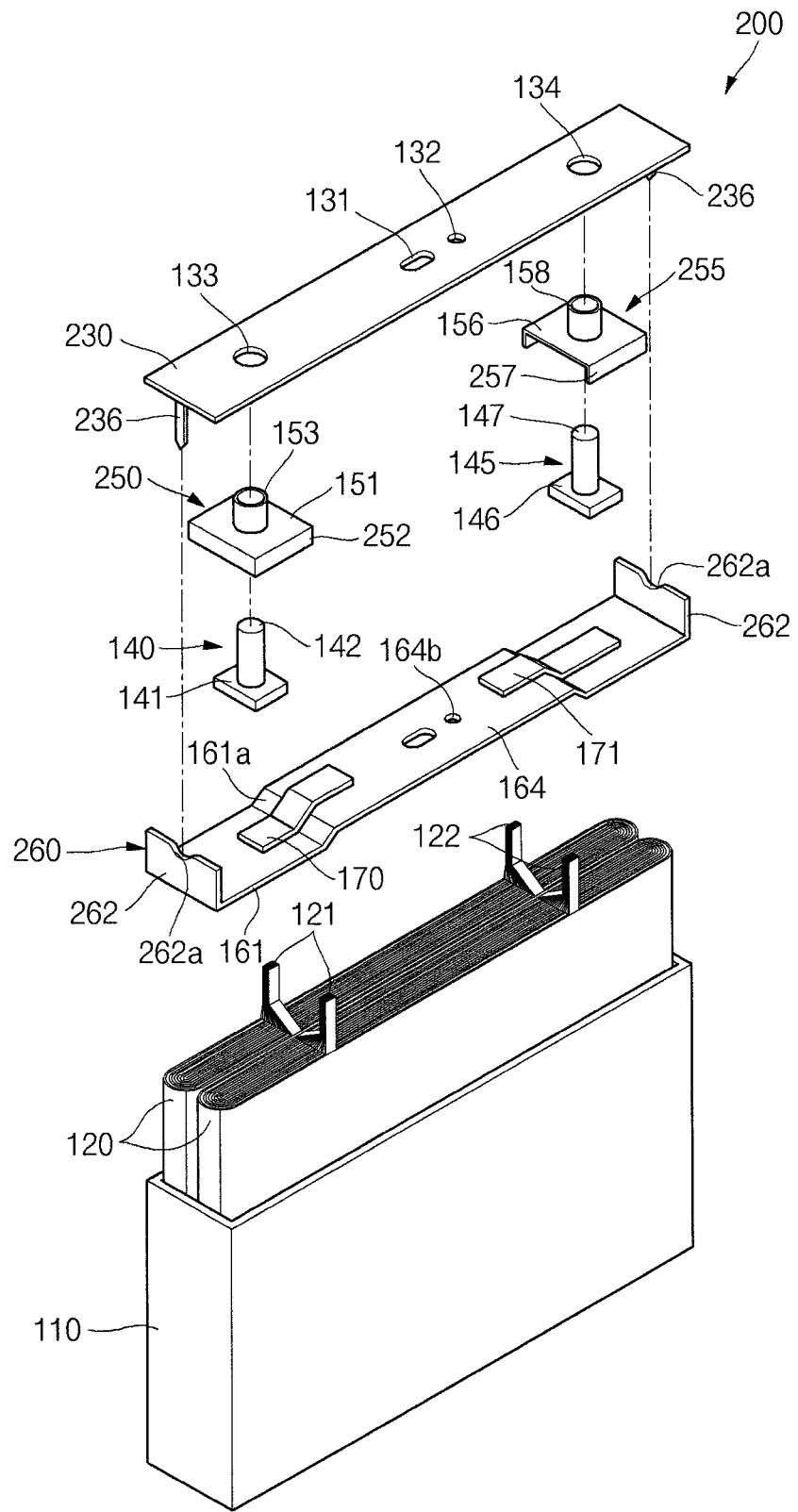
FIG. 7 is an exploded perspective view of a rechargeable battery according to another embodiment of the present invention.
Figure 8:
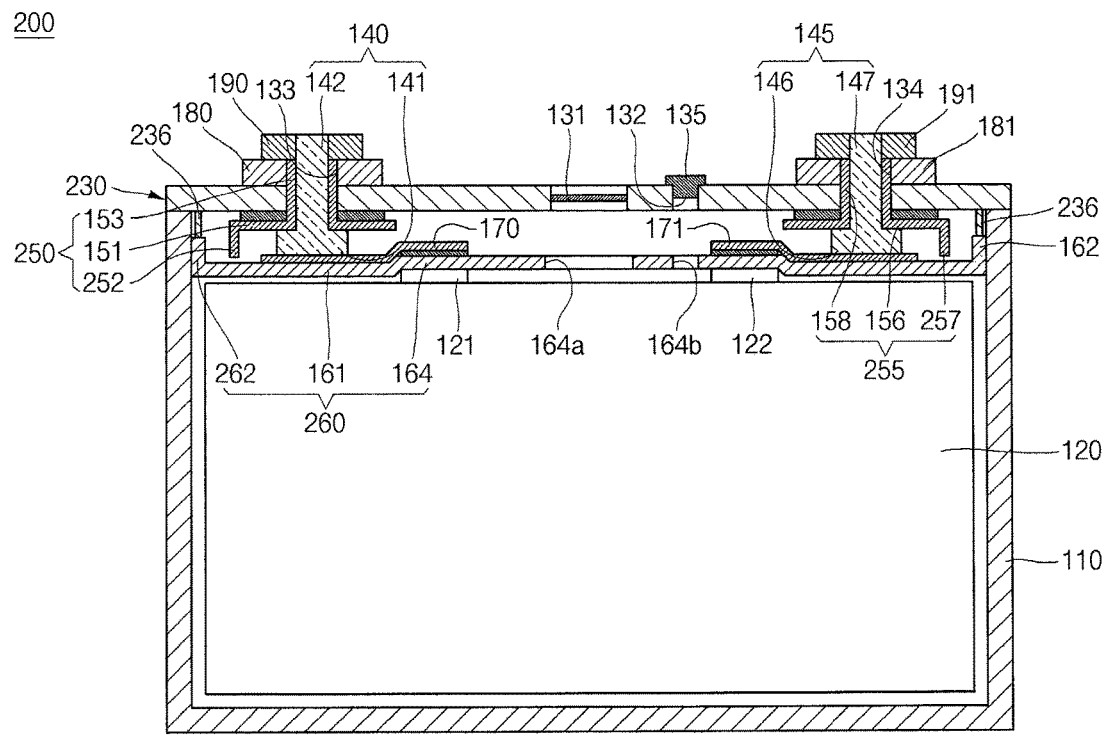
FIG. 8 is a cross-sectional view of the rechargeable battery shown in FIG. 7.
Figure 9:
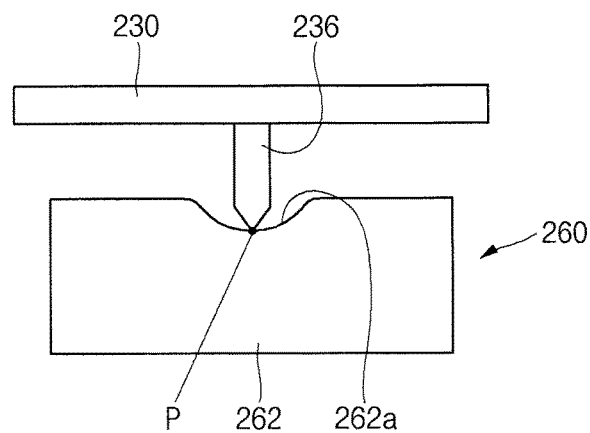
FIG. 9 is a side view illustrating a cap plate and an insulation plate are coupled to each other of the rechargeable battery shown in FIG. 7.

FIG. 7 is an exploded perspective view of a rechargeable battery according to another embodiment of the present invention, FIG. 8 is a cross-sectional view of the rechargeable battery shown in FIG. 7, and FIG. 9 is a side view illustrating a cap plate and an insulation plate that are coupled to each other in the rechargeable battery shown in FIG. 7. In the presently-described embodiment, the same functional components as in the previously-described embodiment are denoted by the same reference numerals. The following description may primarily focus on differences between the presently- and previously-described embodiments.

Referring to FIGS. 7-9, a rechargeable battery 200 according to another embodiment of the present invention includes a case 110, an electrode assembly 120 accommodated in the case 110, a cap plate 230 sealing the case 110, electrode terminals 140 and 145 electrically connected to the electrode assembly 120, gaskets 250 and 255 positioned between the electrode terminals 140 and 145 and the cap plate 230, an insulation plate 260 positioned between the electrode terminals 140 and 145 and the electrode assembly 120, lead tabs 170 and 171 on the insulation plate 260 and forming connecting paths between (e.g., electrically connecting) the electrode terminals 140 and 145 and the electrode assembly 120, insulation members 180 and 181, and terminal plates 190 and 191. The insulation members 180 and 181 and the terminal plates 190 and 191 are on the cap plate 230.

The cap plate 230 includes a pair of protrusions 236 formed at opposite ends thereof in a lengthwise direction protruding from a bottom surface of the cap plate 230 toward the inside of the case 110. The protrusions 236 are centrally formed in a widthwise direction of the cap plate 230. Ends of the protrusions 236 has (e.g., is processed or ground to have) a conical shape. However, shapes of the ends of the protrusions 236 may vary and may have, for example, conical, curved, or polygonal shapes.

The protrusions 236 contact support regions 262 protruding from the insulation plate 260 and are coupled thereto. Accordingly, the protrusions 236 may act as hinge shafts for the support regions 262. Therefore, when an imbalance of the electrode assemblies 120 is caused due to movement of the electrode assemblies 120, the insulation plate 260 moves (e.g., pivots) with respect to the protrusions 236, thereby compensating for the imbalance between the electrode assemblies 120.

The gaskets 250 and 255 include plates 151 and 156 (e.g., plate units), covers 252 and 257 (e.g., cover units) extending vertically downward from the plates 151 and 156, and sealing parts 153 and 158 extending vertically upward from the plates 151 and 156.

In the rechargeable battery 200 according to this embodiment of the present invention, because separate hooks are not formed in the insulation plate 260, separate coupling openings are not provided in the covers 252 and 257. The gaskets 250 and 255 are substantially the same as the gaskets 150 and 155 according to the previously-described embodiment, except for the coupling openings.

The insulation plate 260 includes plate regions 161, a pair of support regions 262 protruding from ends of the plate regions 161 (e.g., ends of the plate regions 161 in a lengthwise direction of the insulation plate 260), and a central region 164 positioned between the plate regions 161 and connected to the plate regions 161 by inclined surfaces 161a to be higher than the plate regions 161 with respect to the electrode assembly 120.

The support regions 262 are formed at opposite ends of the plate regions 161 in the lengthwise direction of the insulation plate 260. In addition, as shown in FIG. 9, each of the support regions 262 includes a coupling groove 262a recessed along a widthwise direction of the plate region 161.

The coupling groove 262a contacts the protrusion 236 of the cap plate 230. In one embodiment, the coupling groove 262a supports the protrusion 236 at one point (e.g., the protrusion 236 is in point contact with the groove 262a). In addition, because the insulation plate 260 is suspended from the cap plate 230 through the electrode terminals 140 and 145 (e.g., is not resting on the electrode assembly 120), the insulation plate 260 may move or pivot vertically due to the coupling structures between the coupling grooves 262a of the insulation plate 260 and the protrusions 236 of the cap plate 230. Therefore, as described above, when the electrode assemblies 120 become imbalanced due to movement of the electrode assemblies 120, the imbalance between the electrode assemblies 120 can be compensated for through the movement or pivoting of the insulation plate 260.

Hereinafter, a rechargeable battery according to still another embodiment of the present invention will be described.

Figure 10:
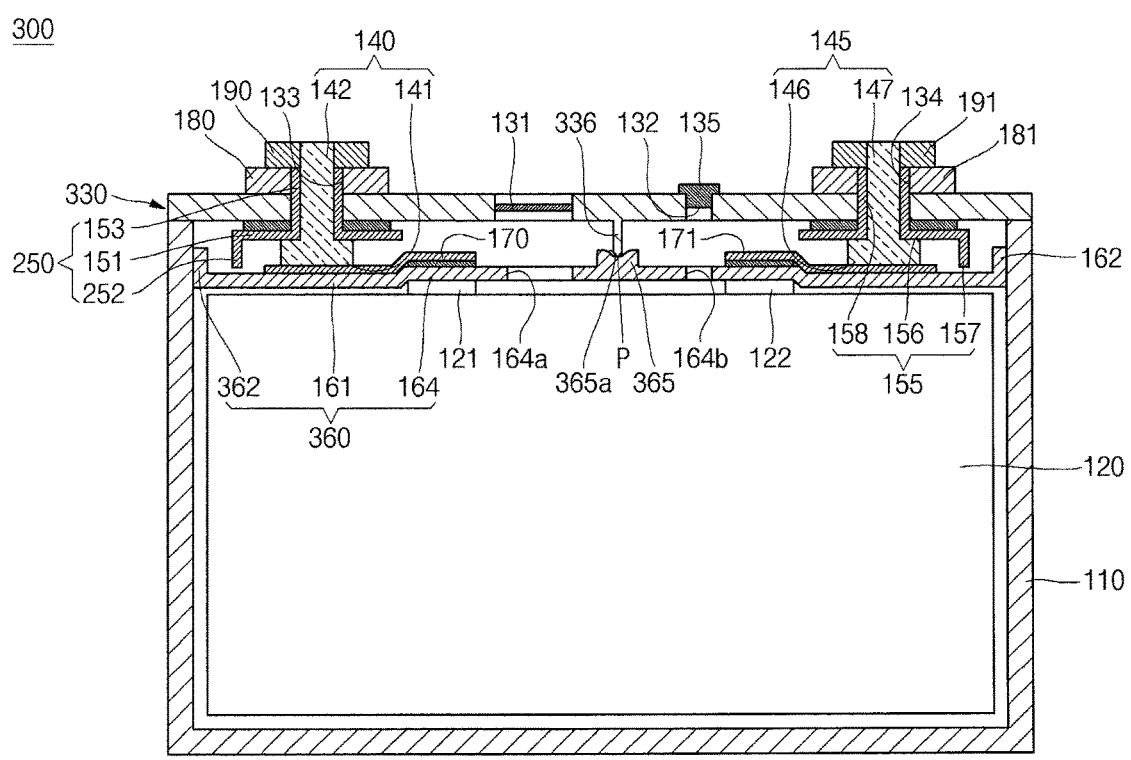
FIG. 10 is a cross-sectional view of a rechargeable battery according to still another embodiment of the present invention.

FIG. 10 is a cross-sectional view of a rechargeable battery according to still another embodiment of the present invention.

Referring to FIG. 10, a rechargeable battery 300 according to still another embodiment of the present invention includes a case 110, an electrode assembly 120 accommodated in the case 110, a cap plate 330 sealing the case 110, electrode terminals 140 and 145 electrically connected to the electrode assembly 120, gaskets 250 and 255 positioned between the electrode terminals 140 and 145 and the cap plate 230, an insulation plate 360 positioned between the electrode terminals 140 and 145 and the electrode assembly 120, lead tabs 170 and 171 on the insulation plate 160 and forming connecting paths between (e.g., electrically connecting) the electrode terminals 140 and 145 and the electrode assembly 120, insulation members 180 and 181, and terminal plates 190 and 191. The insulation members 180 and 181 and the terminal plates 190 and 191 are on the cap plate 130.

The cap plate 330 includes a protrusion 336 centrally formed in lengthwise and widthwise directions of the cap plate 330 and downwardly protruding in a direction from the cap plate 330 toward the electrode assembly 120. The protrusion 336 acts as a hinge shaft (e.g., a pivot) in both widthwise and lengthwise directions with respect to the insulation plate 360 coupled to a bottom portion of the protrusion 336. The bottom portion (e.g., an end) of the protrusion 336 has a cone shape. However, similar to the previously-described embodiments, the bottom portion of the protrusion 336 may have a curved or polygonal shape.

The insulation plate 360 includes plate regions 161, support regions 362, a central region 164, and a protrusion region 365 upwardly protruding from the central region 164.

The support regions 362 are substantially similar to the support regions 262 of the rechargeable battery 200 according to the previously-described embodiment, except that a separate coupling groove is not provided because the protrusion 336 is centrally formed with respect to the insulation plate 360, The protrusion region 365 may be integrally formed at the central region 164 (e.g., may be recessed into the central region 164 of the insulation plate 360) or may be formed as a raised portion of the insulation plate 360. In addition, the protrusion region 365 includes a recessed (e.g., inwardly recessed) coupling groove 365a. The protrusion 336 of the cap plate 330 contacts the coupling groove 365a, thereby acting as a hinge with respect to the protrusion 336. However, in an embodiment in which the insulation plate 360 has a sufficiently large thickness, the protrusion region 365 may not be separately provided (e.g., may not be a protruding region of the insulation plate 360) and the coupling groove 365a may be directly formed in the central region 164 (e.g., the coupling groove 365a may be a groove or depression in the central region 164).

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:
1. A rechargeable battery comprising:
a case;
an electrode assembly comprising a plurality of electrode sub-assemblies accommodated in the case;
a plurality of terminals electrically connected to the electrode assembly;
a cap plate sealing the case and comprising protrusions protruding from a bottom surface of the cap plate toward the electrode assembly in the case, the terminals protruding through the cap plate; and
an insulation plate between the electrode assembly and the terminals and being hingedly coupled to the cap plate, the insulation plate comprising recessed coupling grooves at regions corresponding to the protrusions, the protrusions being hingedly coupled to the insulation plate at the recessed coupling grooves such that the insulation plate is configured to pivot relative to the cap plate.

2. The rechargeable battery of claim 1, wherein the insulation plate is configured to pivot in a widthwise direction of the cap plate.

3. The rechargeable battery of claim 1, wherein the protrusions are at opposite edges of the cap plate in a lengthwise direction thereof.

4. The rechargeable battery of claim 1, wherein the protrusions are at a central region of the cap plate in a lengthwise direction thereof.

5. The rechargeable battery of claim 1, wherein ends of the protrusions have a cone, a curve, or a polygon shape.

* * * * *